(12) United States Patent
Schmidt

(10) Patent No.: US 6,304,867 B1
(45) Date of Patent: Oct. 16, 2001

(54) SYSTEM AND METHOD FOR ENHANCED PERFORMANCE OF A RELATIONAL DATABASE MANAGEMENT SYSTEM THROUGH THE USE OF APPLICATION-SPECIFIC MEMORY-RESIDENT DATA

(75) Inventor: Lawrence F. Schmidt, Fayetteville, GA (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/257,670

(22) Filed: Feb. 25, 1999

(51) Int. Cl.[7] .................................................. G06F 17/30
(52) U.S. Cl. ................................................. 707/2; 707/3
(58) Field of Search .......................................... 707/1–3, 5

(56) References Cited

U.S. PATENT DOCUMENTS

| | | | |
|---|---|---|---|
| 4,839,799 | * | 6/1989 | Takahashi et al. .................. 364/200 |
| 5,715,445 | * | 2/1998 | Wolfe ...................................... 707/5 |
| 5,835,908 | * | 11/1998 | Bennett et al. ...................... 707/10 |
| 5,842,196 | * | 11/1998 | Agarwal et al. ...................... 707/2 |
| 5,940,289 | * | 8/1999 | Iwata et al. ........................... 700/2 |
| 5,946,682 | * | 8/1999 | Wolfe ...................................... 707/5 |
| 6,009,432 | * | 12/1999 | Tarin .................................... 707/10 |
| 6,029,176 | * | 2/2000 | Cannon ............................... 707/104 |
| 6,122,628 | * | 9/2000 | Castelli et al. ........................ 707/5 |
| 6,134,541 | * | 10/2000 | Castelli et al. ........................ 707/2 |

FOREIGN PATENT DOCUMENTS

WO 89/12277 * 12/1989 (WO) ............................. G06F/15/40

OTHER PUBLICATIONS

Nishihara S. et al: "IEEE Transactions on Computers", Database Inspect Online!, Sep. 1987, vol. C–36, No. 9, pp. 1132–1135.*

Elhardt, K. and Bayer, R. "A Database Cache for High Performance and Fast Restart in Database Systems", ACM Transactions on Database Systems, vol. 9, No. 4, Dec. 1984, pp. 503–525.*

Lehman, T.J. and Carey, M.J. "Query Processing in Main Memory Database Management Systems", Proceedings of the ACM Conference on Management of Data, May 28–30, 1986, pp. 239–250.*

Lehman, T.J. and Carey, M.J. "A Study of Index Structures for Main Memory Database Management Systems", Proceedings of the 12th International Conference on Very Large Databases, Aug. 1986, pp. 294–303.*

(List continued on next page.)

Primary Examiner—Jean R. Homere
Assistant Examiner—Luke S Wassum
(74) Attorney, Agent, or Firm—Baker Botts LLP

(57) ABSTRACT

A system for enhancing the performance of a relational database management system is provided which consists of a computer (10) running a relational database management system (16) (RDBMS) with a data storage device (12) containing a database (14) under control of the RDBMS (16). The RDBMS performance enhancement system utilizes a computer memory (22) to store certain data from the database (14). A pre-processor (20), which is part of an application (18) program, executes the performance enhancements which include staging data into memory (22), creating memory-based alternate indexes, and deferring updates until the application (18) terminates. The performance enhancements reduce data access requests to the RDBMS (16) and eliminate unnecessary RDBMS (16) operations.

36 Claims, 7 Drawing Sheets

OTHER PUBLICATIONS

Fredman, M.L. and Tarjan, R.E. "Fibonacci Heaps and their Uses in Improved Network Optimization Algorithms", Journal of the ACM, vol. 34, No. 3, Jul. 1987, pp. 596–615.*

Roussopoulos, N. "Overview of ADMS: A High Performance Database Management System", Proceedings of the 1987 Fall Joint Computer Conference on Exploring Technology: Today and Tomorrow, 1987, pp. 452–460.*

Garcia–Molina, H. and Salem, K. "Main Memory Database Systems: An Overview", IEEE Transactions on Knowledge and Data Engineering, vol. 4, No. 6, Dec. 1992, pp. 509–516.*

Kumar, V. and Burger, A. "Performance Measurement of Main Memory Database Recovery Algorithms Based on Update–in–Place and Shadow Approaches", IEEE Transactions on Knowledge and Data Engineering, vol. 4, No. 6, Dec. 1992, pp. 567–571.*

Jagadish, V.H. et al. "Dali: A High Performance Main Memory Storage Manager", Proceedings of the 20th Conference on Very Large Databases, 1994.*

Gruenwald, L. et al. "Recovery in Main Memory Databases", International Journal of Engineering Intelligent Systems, Special Issue on Databases and Telecommunications, Jul. 1996, pp. 1–17.*

Choi, K–R., and Kim, K–C. "T*–tree: A Main Memory Database Index Structure for Real Time Applications", Proceedings of the 3rd International Workshop on Real–Time Computing Systems and Applications, 1996, pp. 81–88.*

Bohannon, P. et al. "The Architecture of the Dali Main–Memory Storage Manager", Journal of Multimedia Tools and Applications, 4/2, 1997, pp. 1–36.*

Knuth, D.E. "The Art of Computer Programming, Second Edition, vol. 3: Sorting and Searching", Reading:Addison––Wesley, 1998, pp. 417–419, QA76.6.K64 1997.*

Park, J.H. et al. "Xmas: An Extensible Main–Memory Storage System for High–Performance Applications", Proceedings of the 1998 ACM SIGMOD International Conference on Management of Data, Jun. 1–4, 1998, pp. 578–580.*

Polyhedra: Journal Control Process [software manual], Polyhedra plc, Aug. 24, 1998.*

Polyhedra: SQL Client [software manual], Polyhedra plc, Aug. 24, 1998.*

Polyhedra: Polyhedra Overview [software manual], Polyhedra plc, Aug. 24, 1998.*

Gruenwald, L. et al. "Effects of Update Techniques on Main Memory Database System Performance", IEEE Transactions on Knowledge and Data Engineering, vol. 10, No. 5, Sep./Oct. 1998, pp. 859–861.*

Polyhedra: Polyhedra User's Guide [software manual], Polyhedra plc, Oct. 9, 1998.*

Baulier, J. et al. "DataBlitz Storage Manager: Main–Memory Database Performance for Critical Applications", Proceedings of the 1999 ACM SIGMOD International Conference on Management of Data, May 31–Jun 3, 1999, pp. 519–520.*

"DataBlitz Architectural Overview" [on–line] Lucent Technologies, [retrieved Dec. 18, 2000], Retrieved from the Internet: http://www.bell–labs.com/project/dali/overview.ps.*

"The Dali Main–Memory Storage Manager" [on–line] Lucent Technologies, [retrieved Dec. 15, 2000], Retrieved from the Internet: http://www.bell–labs.com/project/dali/.*

"DataBlitz: A Main Memory Database and Storage Manager from Lucent Technologies" [on–line] Lucent Technologies, [retrieved Dec. 18, 2000], Retrieved from the Internet: http://www.bell–labs.com/project/dali/features.ps.*

"Dali: Motivation and Principles" [on–line] Lucent Technologies, [retrieved Dec. 15, 2000], Retrieved from the Internet: http://www.bell–labs.com/project/dali/motivation.html.*

"Polyhedra Product Overview" [on–line] Polyhedra plc, [retrieved Dec. 19, 2000], Retrieved from the Inernet: http//www.polyhedra.com/product.htm.*

Garcia–Molina, H., and Salem, K. "High Performance Transaction Processing with Memory Resident Data", Proceedings of the International Workshop on High Performance Transaction System. Dec. 1987, pp. 211–224.*

Garcia–Molina, H, and Salem, K. "Main Memory Database Systems: An Overview", IEEE Transactions on Knowledge and Data Engineering, vol. 4, No. 6, Dec. 1992, pp. 509–516.*

Garcia–Molina, H, and Salem, K. "High Performance Transaction Processing with Memory Resident Data", Proceedings of the International Workshop on High Performance Transaction Systems, Dec. 1987, pp. 211–224.*

Lehman, T.J., and Carey, M.C., "A Study of Index Structures for Main Memory Database Management Systems", Proceedings of the Twelfth International Conference on Very Large Databases, Aug. 1986, pp. 294–303.*

Lehman, T.J., and Carey, M.C., "Query Processing in Main Memory Database Management Systems", Proceedings of the Conference on Management of Data, May 28–30, 1986, pp. 239–250.*

* cited by examiner

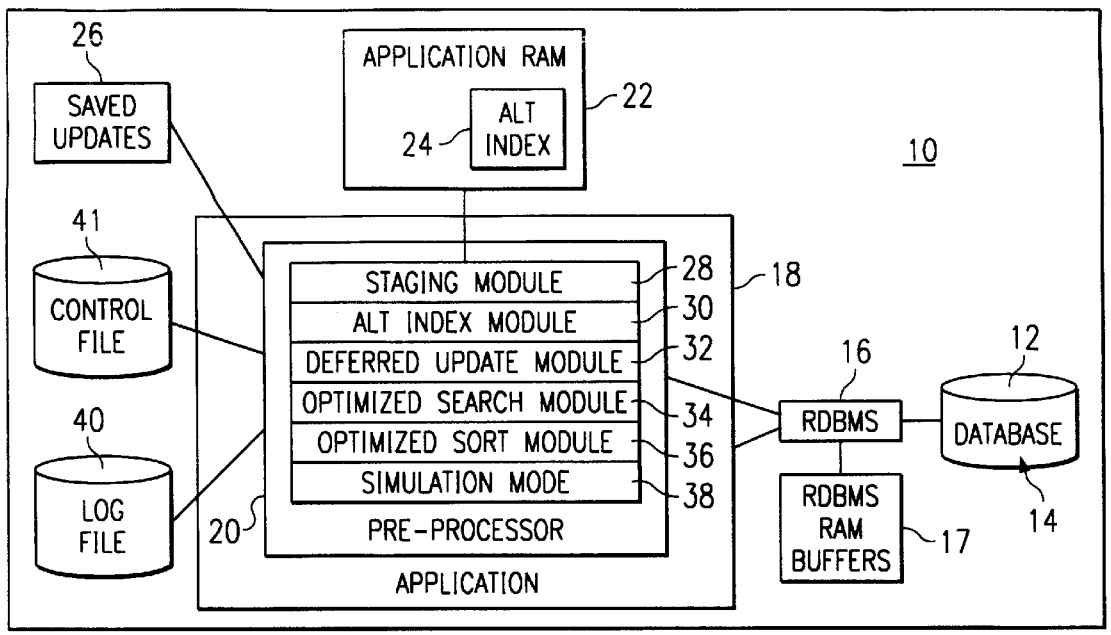
FIG. 1
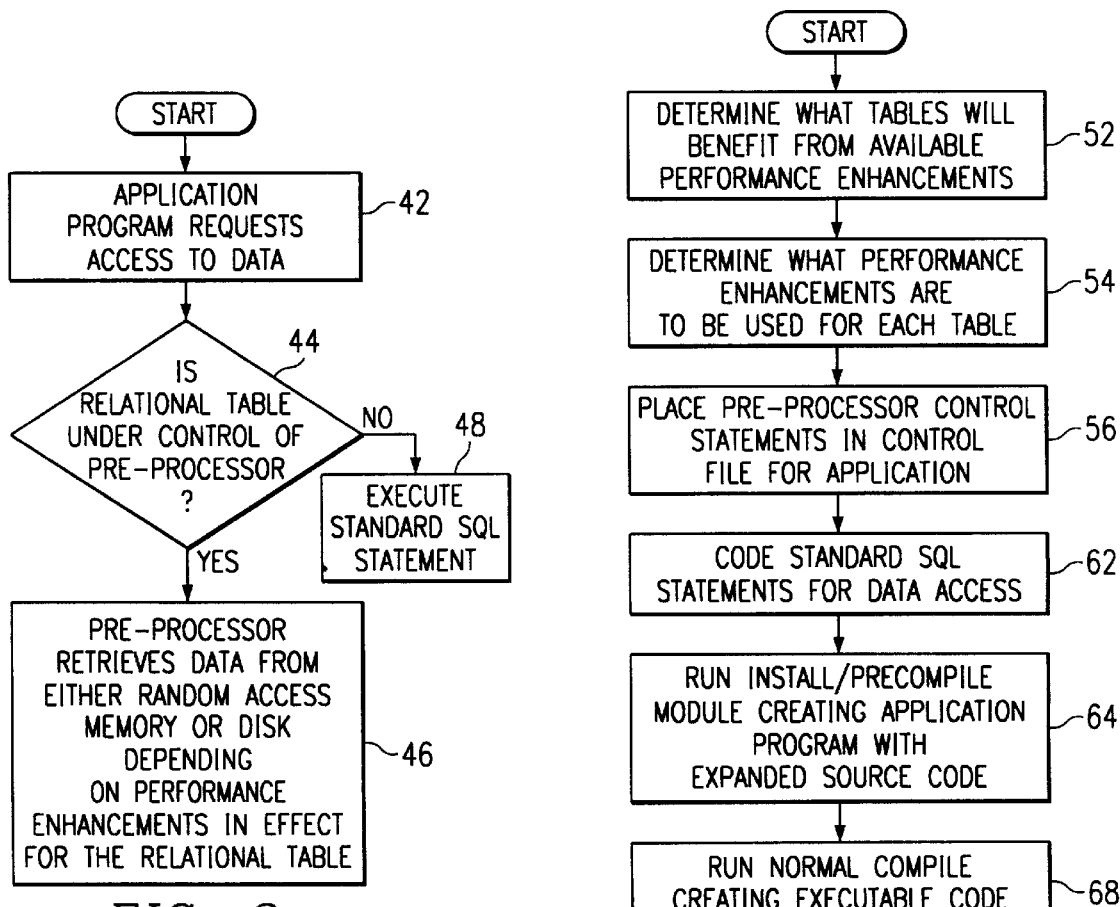
FIG. 2
FIG. 3a

SYSTEM AND METHOD FOR ENHANCED PERFORMANCE OF A RELATIONAL DATABASE MANAGEMENT SYSTEM THROUGH THE USE OF APPLICATION-SPECIFIC MEMORY-RESIDENT DATA

TECHNICAL FIELD OF THE INVENTION

This invention relates generally to database access techniques and more particularly to a system and method for enhancing the performance of a relational database management system.

BACKGROUND OF THE INVENTION

A relational database management system (RDBMS) offers users of the system increased functionality and flexibility over traditional methods of organizing and accessing data. However, this increased functionality and flexibility comes at a cost of reduced application and transaction performance due to the increased processing overhead associated with these systems. Most applications do not require every feature that an RDBMS offers.

In a business environment, most applications use a large number of relational tables which define the valid set of values for a specific field on a transaction. These relational tables are accessed often as the computer system verifies that each field on a transaction is one of the valid values. This results in a large number of read requests to the RDBMS for table rows which degrades overall system performance. In addition, these relational tables must be available for updating through the RDBMS. However, updates to these relational tables seldom occur during the business day. In order to support the ability to change these tables at any time as well as maintain the constant availability of these tables, the RDBMS must retain the table within the RDBMS's input/output hierarchy. This degrades system performance even though the table maintenance functionality is rarely used.

Some applications use a subset or portion of a relational table. Moreover, some batch applications will process only a small portion of a complete relational table during any execution of that application. The application must have access to the complete table so that it can gain access to the subset of the table necessary for the execution of the application. Having the complete table available to the application when the application only requires a subset of the table causes additional processing overhead which could be avoided. This ultimately leads to degradation of application performance.

Batch applications typically share buffer pools with other batch applications running at the same time. Sharing of buffer pools results in a performance problem known as buffer stealing. The stealing of a buffer previously assigned to another application results in additional physical reads to the data in order to place the data in another buffer area. There is no way at the present time to prevent an application from using certain resources within the RDBMS's address space. In other words, users cannot systematically check out a complete relational table from the RDBMS and have it available in memory for the duration of the application.

Testing of applications using RDBMS technology is more complex than testing of applications which employ traditional methods of accessing and organizing data. Currently, there is no way to simulate updates to a relational table within an RDBMS without actually performing the update. Therefore, a test version of the database must be loaded by a database administrator before an application test can commence. In addition, if a test of an application must be rerun, the relational table must be reset, or reloaded, to the version which existed prior to the test execution of the application. This process usually requires the aid of a database administrator running a batch job to reload the database.

Applications developed using computer aided software engineering (CASE) technology traditionally do not perform as well as applications coded directly by a software engineer. One major performance issue with CASE developed applications centers around the inputting and outputting of data. Skilled CASE users can address these types of performance issues by employing certain performance improving techniques within the CASE tool. However, focusing on performance improvement during application development usually decreases the software engineer's productivity potential with the CASE tool. Currently, there are no products available which allow the software engineer to focus on development of an application program without paying attention to the overall performance needs of an application system.

SUMMARY OF THE INVENTION

From the foregoing, a need has arisen for an improved system and method for accessing data in a relational database. In accordance with the present invention, an improved system, which enhances the performance of a relational database management system (RDBMS), for accessing data in a relational database is provided which substantially reduces disadvantages or problems associated with conventional relational database access techniques.

According to one embodiment of the present invention, there is provided a system for enhancing the performance of a relational database management system that comprises a computer, a data storage device, a random access memory assigned for use by an application, a relational database management system running on the computer to organize and control access to data on the data storage device, and a pre-processor which enhances the performance of an RDBMS. The database manager pre-processor functions within application programs to reduce the number of data access requests to the relational database management system. The database manager pre-processor reduces the RDBMS requests by staging data into memory, creating memory-based alternate indexes, and deferring updates to the database until the application program terminates.

The present invention provides various technical and operational advantages over standard relational database access techniques. One important advantage of the present invention is that all or part of a relational database table can be checked out and loaded into random access memory thereby reducing the total number of RDBMS requests. Another important advantage stemming from the loading of database table rows into memory is the reduction of the phenomena known as buffer stealing. Yet another important advantage is the ability to use live production data to test modifications to application programs. Still another important advantage is the improved productivity of software engineers due to the fact that performance issues no longer need to be addressed during application development. Other advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawing in which:

FIG. 1 is a block diagram of a computer system containing a disk drive, a database, random access memory, application programs, an RDBMS, and a pre-processor;

FIG. 2 is a flow diagram illustrating the general processing of the pre-processor;

FIG. 3(a) illustrates a flow diagram representing the initial steps taken to utilize the relational database management system performance enhancements and installing those performance enhancements in an application program;

DETAILED DESCRIPTION OF THE DRAWINGS

Figure 3B:
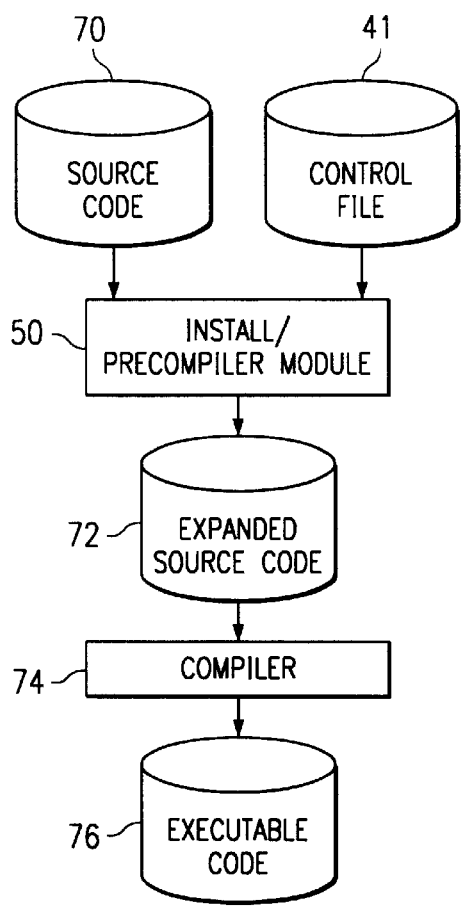
FIG. 3(b) is a data flow diagram illustrating the various states of a source code file as it is processed into executable code.

Referring to FIG. 1, a computer is generally indicated at 10 consisting of several component parts including a disk drive 12 which contains a database 14. Computer system 10 contains a relational database management system (RDBMS) 16 and an application 18 which accesses data in database 14. Application 18 contains a pre-processor 20. Pre-processor 20 consists of a staging module 28, and alternate index 30, a deferred update module 32, an optimized search module 34, an optimized sort module 36, and a simulation mode 38. Pre-processor 20 has several functions, one of which is to reduce the RDBMS call requirements of application 18 thereby enhancing the performance of application 18. Reducing the number of calls to RDBMS 16 enhances performance of application 18 since reading and writing ("accessing") data on a disk drive is among the most costly, in terms of processing time and performance of applications, computer processes. However, accessing data which is in the application's random access memory is very quick compared to reading data from a disk drive. Therefore, if RDBMS calls can be reduced and replaced with accesses to random access memory, the processing time of an application will be reduced, and its performance will be enhanced. This process is referred to as staging data which means that data is taken from a database and placed in random access memory (RAM) that is controlled by the application so that future accesses to the data by an application program are to RAM instead of requiring a physical input/output operation or an RDBMS buffer retrieval from an RDBMS RAM 17 which contains the RDBMS buffer areas. Each application running on computer system 10 is assigned a portion of random access memory which it may use while it is running. This RAM is referred to as "application RAM" to indicate the portion of RAM controlled by the application.

Pre-processor 20 may also provide other performance enhancements for RDBMS 16 and application 18 in addition to staging data. Pre-processor 20 may perform the following performance enhancements: stage data into application RAM which includes staging an entire relational table, staging specific rows known to be accessed frequently in an application, and staging all table rows that have keys similar to keys known to be accessed frequently in an application; retain in application RAM for further accesses either all or part of the table rows accessed during an execution of an application; subset a table and create a version of the table in application RAM for use by the currently executing application; create application RAM based alternate indexes to a relational table staged into application RAM; defer all updates to a specified table until the application terminates; and search and sort tables and indexes more efficiently than a standard RDBMS. In addition, the system of the present invention provides an install/pre-compiler module to create the necessary application program statements in affected applications and a simulation mode to allow testing of applications on live production data. These functions of the present invention will be discussed in detail in the following parts of this specification.

Pre-processor 20 may consist of statements and routines inserted into application programs, such as application 18. These statements provide the performance enhancements of the present invention for the application program. The software engineer has the ability to customize the performance of the RDBMS dependent upon the business requirements of the application. A control file for the application contains a list of the performance enhancements activated for each relational table in application 18. This control file is read as part of the initialization procedure for pre-processor 20. Thus, the performance enhancements of the present invention can be turned on or off at application runtime for each relational table within an application program. The software engineer determines which relational tables require which performance enhancements and enters these instructions into an install/pre-compiler control file 41 which will be discussed below. After creating the install/pre-compiler control file 41, the software engineer is no longer concerned about performance enhancements during application development or at runtime.

Pre-processor 20 utilizes basic operations of RDBMS 16 to access database 14. The software engineer uses standard structured query language (SQL) in application 18. Therefore, there are no special coding techniques which must be used. Pre-processor 20 has the ability to process any SQL verb such that RDBMS requirements are kept to a minimum. These SQL verbs include, but are not limited to, SELECT, OPEN, FETCH, CLOSE, INSERT, UPDATE, DELETE, COMMIT, ROLLBACK, and SET. Pre-processor 20 can also process sub-verbs of SQL including, but not limited to, UNION, JOIN, FROM, WHERE, ORDER BY, LIKE, IS NULL, and HOLD. The software engineer simply codes standard SQL statements in order to interface with pre-processor 20. In addition to the standard SQL statements, the software engineer places a list of relational tables that are to be controlled by pre-processor 20 and the performance enhancements applicable to each table in a control file 41 for application 18. A pre-compiler is run against both application 18 and the install/pre-compiler control file 41 where the SQL statements in application 18 are altered and subroutines inserted to provide the necessary information for pre-processor 20.

Pre-processor 20 may keep a log file 40 of all database access requests that it processes. Log file 40 can be utilized in debugging application programs.

Application 18 can access database 14 by submitting a request to either pre-processor 20 or RDBMS 16. Pre-processor 20 can access database 14 or by utilizing a basic function of RDBMS 16 dependent upon the SQL verb being processed by pre-processor 20. Pre-processor 20 can utilize a random access memory (RAM) 22 which is assigned to application 18 to enhance the performance of data access requests which it receives from application 18. When application 18 begins to execute, computer system 10 assigns a portion of random access memory for use by application 18.

FIG. 2 is a flow diagram illustrating the general processing of pre-processor 20 within application 18. The process commences at step 42 where application 18 issues a data access request. The process then continues to step 44 where a decision is made determining whether the relational table, which is the subject of the data access request, is under the control of pre-processor 20. If it is, the process proceeds to step 46 where pre-processor 20 retrieves the data from either application RAM 22 or through RDBMS 16 depending upon pre-processor's 20 performance enhancements utilized for application 18. If the relational table is not under the control of pre-processor 20, then the process proceeds to step 48 where a standard SQL statement is processed by RDBMS 16 in order to retrieve the requested data. In either case, application 18 now has the requested data available.

Pre-Compiler/Install Module

FIG. 3(a) illustrates a flow diagram representing the initial steps taken to determine which performance enhancements discussed in this specification should be used and the steps taken to install those performance enhancements in application 18. FIG. 3(b) illustrates a data flow diagram representing the various states of application 18 source code as it is processed into executable code. These figures will be discussed together in this next section. The process commences at step 52 where a software engineer, developing a software application which accesses relational table rows in database 14, determines which relational tables will benefit from the available performance enhancements. The process then proceeds to step 54 where the software engineer determines what performance enhancements, if any, are to be used for each relational table in software application 18. The process then proceeds to step 56 where the software engineer places control statements in an install/pre-compiler control file 41 which informs install/pre-compiler module 50 which relational tables will be controlled by pre-processor 20. Control file 41 is also used at runtime to inform pre-processor 20 regarding which performance enhancements are activated for a relational table under its control. Control file 41 is read during an initialization procedure for application 18. Thus, control file 41 is used in both the install/pre-compiler module 50 and also at runtime in application 18.

As previously discussed, the software engineer's interface to pre-processor 20 is standard SQL, and the performance enhancements of pre-processor 20 exist as routines inserted into application 18. The process then proceeds to step 62 where the software engineer inserts in application 18 data access program statements in standard SQL format as needed. At this point, the software engineer is unconcerned with the fact that certain relational tables in database 14 are under the control of pre-processor 20. When the software engineer completes the development of application 18, the software engineer places the application program code in an application source code file 70. The process then proceeds to step 64 where install/pre-compiler module 50 is run against application source code file 70 and install/pre-compiler control file 41.

Install/pre-compiler module 50 generates an expanded source code file 72. Expanded source code file 72 contains program statements to support pre-processor 20 which were installed in application 18 for certain relational tables in database 14. After install/pre-compiler module 50 generates expanded source code file 72, the process proceeds to step 68 where the software engineer runs a normal compiler 74 against expanded source code file 72 to generate executable code 76.

Figure 4:
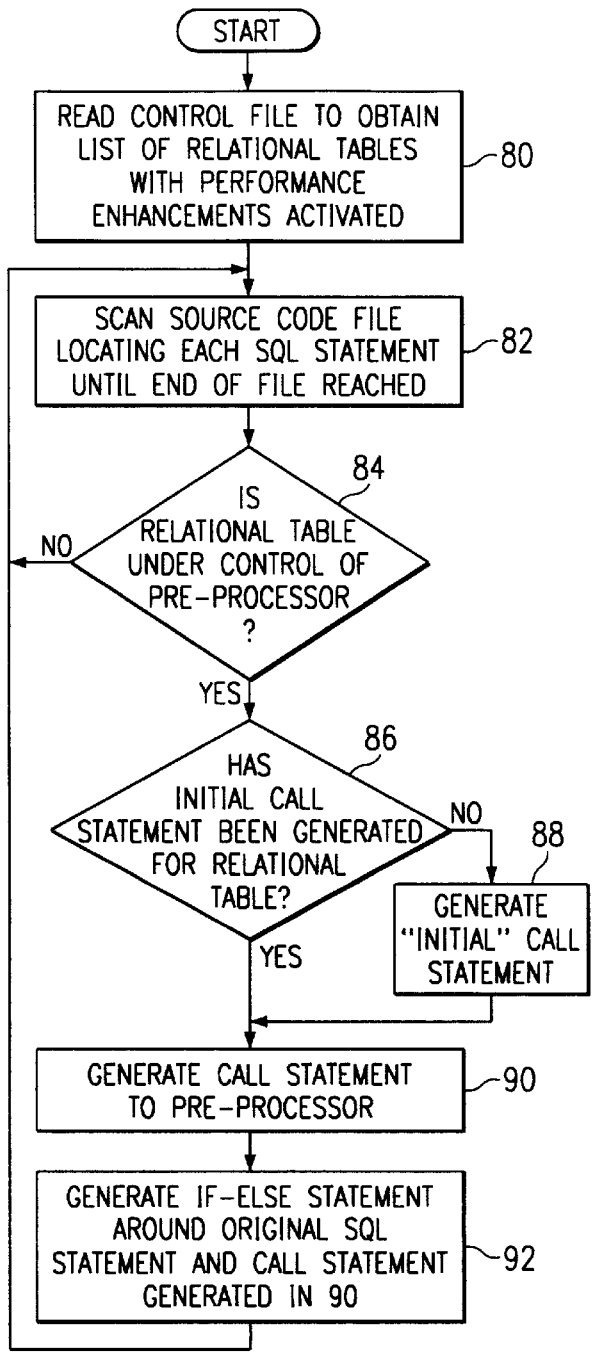
FIG. 4 is a flow diagram illustrating the process of installing the performance enhancements in the application program.

FIG. 4 illustrates the process of install/pre-compiler module 50 generating expanded source code file 72. Recall that install/pre-compiler module 50 has as inputs install/pre-compiler control file 41 and application source code file 70. The process commences at step 80 where install/pre-compiler 50 reads install/pre-compiler control file 41 to determine which relational tables in database 14 will be under the control of pre-processor 20. Any relational table used in application 18 which has performance enhancements of pre-processor 20 installed is under the control of the pre-processor 20 for all data access requests within application 18.

The process then proceeds to step 82 where each source code line is scanned until the end of source code file 70 is reached at which point the process of FIG. 4 terminates. Step 82 scans source code file 70 until an SQL statement is found. The process proceeds to step 84 where a determination is made regarding whether the relational table referenced in the SQL statement is under the control of pre-processor 20. If the relational table is not under the control of pre-processor 20, the process proceeds back to step 82 where the next SQL statement is found. If the relational table referenced in the SQL statement is under the control of pre-processor 20, the process proceeds to step 86 where a determination is made regarding whether an "initial" call statement has been generated for the relational table referenced in the SQL statement. Install/pre-compiler module 50 generates the initial call statement at step 88 so that it is among the first statements executed in application 18. During runtime, the initial call to pre-processor 20 causes pre-processor 20 to read control file 41 to determine which performance enhancements are activated for the relational table referenced in the initial call statement. For the remainder of the execution of application 18, pre-processor 20 will perform data access requests utilizing the performance enhancements which were activated in control file 41. The process then proceeds to step 90 which will be discussed below.

If an initial call statement has already been generated for the relational table reference in the SQL statement, the process proceeds from step 86 to step 90 where install/pre-compiler module 50 generates a call statement to pre-processor 20 with an appropriate parameter list based on the contents of the standard SQL statement. Install/pre-compiler module 50 also generates the necessary program work areas for pre-processor 20. The process then proceeds to step 92 where install/pre-compiler module 50 places an IF-ELSE statement around the call statement generated in step 90 and the original standard SQL statement found in step 82 so as to preserve both statements. The IF statement determines whether to execute the call to pre-processor 20 or the standard SQL statement. An example of this IF statement is as follows:

```
IF table-switch equals "on"
    MOVE "select" to parmlist-VERB
    CALL "pre-processor" using parmlist
ELSE
    EXEC SQL SELECT . . .
    END-EXEC
END-IF
```

The IF statement provides the software engineer with flexibility in the use of pre-processor 20 by allowing a table switch to be set in control file 41 and read during the initialization procedure for application 18 to determine whether pre-processor 20 will control the relational table for that execution of application 18. Thus, the software engineer can turn on and turn off pre-processor 20 without recompiling application 18. The IF statement also retains the original standard SQL statement for documentation purposes. Once the final source code statement in source code file 70 is reached, the process of FIG. 4 terminates, and the results of install/pre-compiler module 50 are placed in expanded source code file 72 for use in a standard compile process.

Staging of Data

One of the ways that pre-processor 20 enhances the performance of RDBMS 16 is through a process of staging data into application RAM 22. Staging data consists of reading relational table rows from database 14 and placing those rows in application RAM 22 for use during the execution of application 18. Thus, additional requests for the same table row will require only an access to application RAM 22 instead of a request to RDBMS 16. Pre-processor 20 keeps track of what relational tables have table rows staged into application RAM 22 so that further accesses to those table rows are directed to application RAM 22 instead of database 14. The application that requests data to be staged into memory has access to the data in application RAM 22. All other applications that may access the same data will access the data in the relational database.

Pre-processor 20 may stage an entire relational table into RAM 22. The staging of an entire database may be used, for instance, to load small tables which are accessed frequently into RAM 22. For example, if a table is thirty rows long and is accessed an average three hundred times per execution of application 18, the performance of RDBMS 16 can be enhanced by expending one RDBMS request for the 30 rows at the start of the execution of application 18 in order to save three hundred RDBMS requests which would be distributed throughout the execution of application 18. In this example, each of the three hundred requests to the database table would be an access to RAM 22 which is significantly more efficient than a data access request to RDBMS 16. Staging an entire relational table into RAM 22 incurs the expense of one RDBMS request for each relational table row at the beginning of the execution of application 18. However, no further RDBMS requests to the relational table loaded into RAM 22 occur for the remainder of the execution of application 18.

Figure 5:
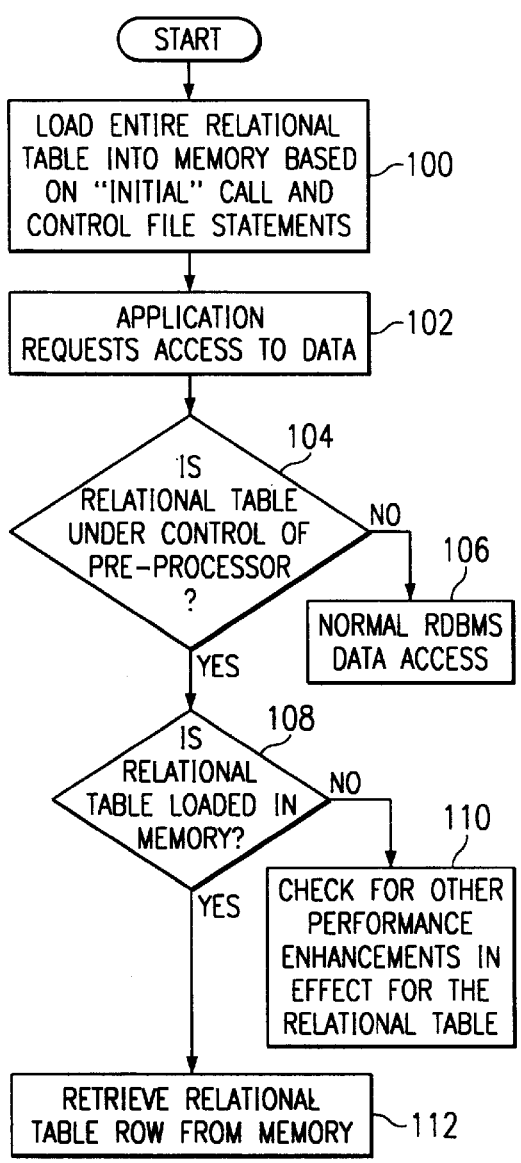
FIG. 5 is a flow diagram illustrating the basic process of staging an entire relational table into random access memory.

FIG. 5 is a flow diagram illustrating the basic process of staging an entire relational table into application RAM 2 and the subsequent data access requests from application 18. The process of staging an entire relational table into application RAM 22 commences at step 100 where pre-processor 20 receives an "initial" call causing it to read control file 41 which may contain an instruction requesting that a certain relational table be loaded into application RAM 22. Pre-processor 20 then loads the requested relational table into application RAM 22 and sets certain parameters so that all further requests for data from that relational table may be made to application RAM 22 instead of RDBMS 16. The process then proceeds to step 102 where application 18 requests data. The process then proceeds to step 104 where application 18 determines whether the relational table in the data request is controlled by pre-processor 20. If it is not controlled by pre-processor 20, the process proceeds to step 106 where a standard data request is issued to RDBMS 16.

If step 104 determines that the relational table of the data request in step 102 is controlled by pre-processor 20, the process proceeds to step 108 where pre-processor 20 determines whether the requested relational table is loaded in application RAM 22. If it is not, the process proceeds to step 110 where pre-processor 20 determines if any other performance enhancements are applicable to application 18. Pre-processor 20 then retrieves the requested data from either RDBMS 16 or application RAM 22 depending upon the performance enhancements, if any, which are applicable to the requested relational table. If step 108 determines that the requested relational table is loaded in application RAM 22, the process proceeds to step 112 where the data requested in step 102 is retrieved from application RAM 22.

Pre-processor 20 can also stage specific records into RAM 22. If the software engineer knows that certain table rows are accessed frequently during the execution of application 18, the software engineer can have pre-processor 20 load the specified table rows into application RAM 22 at the start of application 18 so that further accesses to the table rows during the execution of application 18 will not incur an RDBMS request. Pre-processor 20 keeps track of what table rows for what relational tables are loaded into application RAM 22. If a requested table row is in application RAM 22, pre-processor 20 retrieves it from application RAM 22, otherwise pre-processor 20 issues a standard RDBMS 16 request to retrieve the requested table row from database 14.

Figure 6:
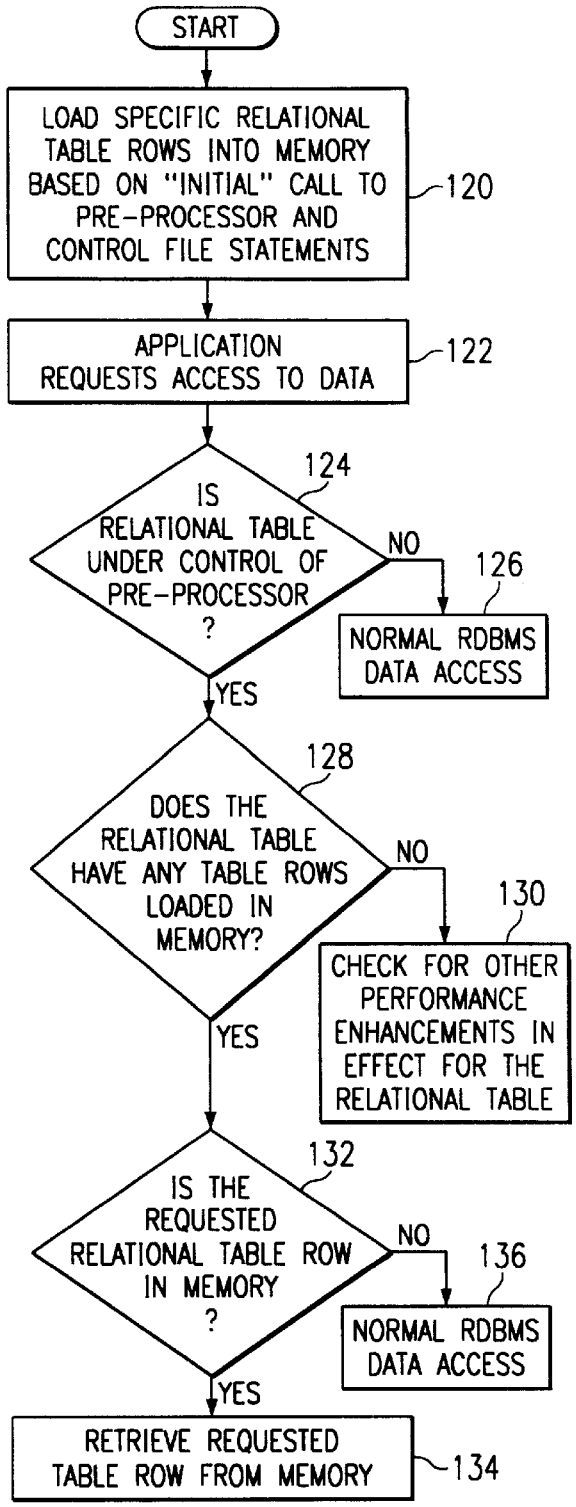
FIG. 6 is a flow diagram illustrating the basic process of staging specific relational table rows into random access memory.

FIG. 6 is a flow diagram illustrating the basic process of staging specific relational table rows into RAM 22, and the subsequent data access requests to those rows from application 18. The process commences at step 120 where pre-processor 20 receives an "initial" call causing it to read control file 41 which may contain statements for a particular relational table requesting that specific relational table rows be loaded into application RAM 22. Pre-processor 20 loads the requested table rows into application RAM 22 and keeps track of the table rows which were loaded so that further accesses to those table rows will be to application RAM 22 instead of RDBMS 16. The process then proceeds to step 122 where application 18 requests access to a certain table row.

The process then proceeds to step 124 where a determination is made regarding whether the relational table to which access was requested in step 122 is under the control of pre-processor 20. If it is not, the process proceeds to step 126 where normal database processing takes place utilizing RDBMS 16. Note that the determination of which relational tables will be controlled by pre-processor 20 is done at compile time. However, the determination of which type of performance enhancement is applicable to the relational table is made at runtime by pre-processor 20 reading control file 41. If application 18 contains a call to pre-processor 20 for the data request in step 122, then the requested table is under the control of pre-processor 20. If application 18 contains only a standard SQL statement for the data access request of step 122, then the relational table is processed normally without any performance enhancements. The inclusion of step 124 is merely to explicitly state that at some point in time, a determination is made whether the data access request to the relational table is through pre-processor 20 or RDBMS 16.

If step 124 determines that the relational table is under the control of pre-processor 20, the process proceeds to step 128 where pre-processor 20 determines if the requested table has any table rows loaded in application RAM 22. If it does not, the process proceeds to step 130 where pre-processor 20 checks for other types of performance enhancements for the requested relational table and retrieves the requested table row as necessary. If step 128 determines that the requested relational table has table rows loaded in application RAM 22, the process proceeds to step 132 where a determination is made regarding the existence of the requested table row in application RAM 22. If the requested table row is in application RAM 22, the process proceeds to step 134 where pre-processor 20 retrieves the table row from application RAM 22 and returns it for use in application 18. If step 132 determines that the requested table row is not in application RAM 22, the process proceeds to step 136 where pre-processor 20 performs a normal database access request through RDBMS 16 and returns the table row for use in application 18.

Pre-processor 20 can also stage all records with similar keys or the same partial key into RAM 22. This is accomplished by storing the returned relational table rows of a "select on partial key" in RAM 22. As discussed above, pre-processor 20 keeps track of every relational table row loaded into RAM 22 and any further request for access to that relational table row is processed by an access to RAM 22 instead of a request to RDBMS 16. Staging the results of a select on partial key into RAM 22 can be used when the software engineer knows that only that specified group of relational table rows is used during the execution of application 18.

Figure 7:
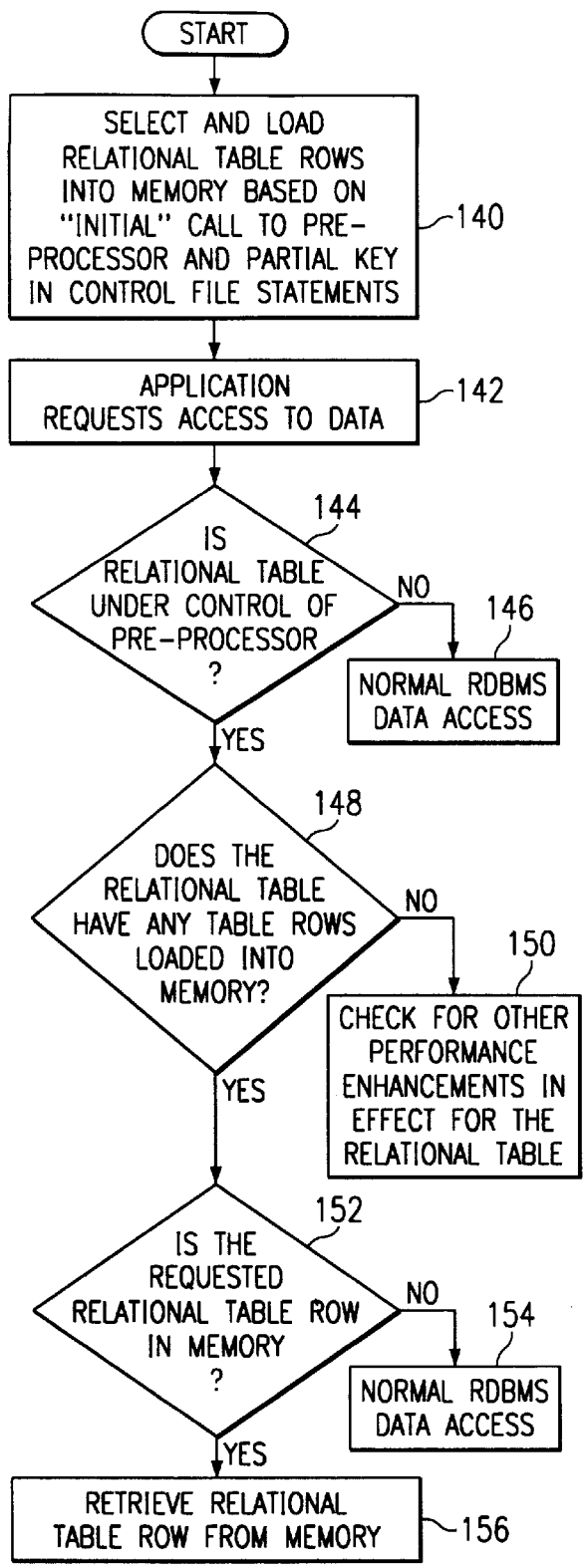
FIG. 7 is a flow diagram illustrating the basic process of staging relational database table rows into random access memory that match a partial key.

FIG. 7 is a flow diagram illustrating the basic process of staging a relational table into application RAM 22 based on a partial key and the subsequent data access requests to that relational table in application 18. The process commences at step 140 where pre-processor 20 receives an "initial" call causing it to read control file 41 which may contain instructions requesting that table rows which match a specified partial key for a certain relational table be loaded into application RAM 22. Pre-processor 20 then selects the relational table rows as requested based on information contained in control file 41. The selected table rows are placed in application RAM 22, and pre-processor 20 keeps track of the table rows which it has placed in application RAM 22.

The process then proceeds to step 142 where application 18 requests access to one or more table rows. The process then proceeds to step 144 where a determination is made regarding whether the requested relational table is controlled by pre-processor 20. If it is not, the process proceeds to step 146 where a normal database access takes place using RDBMS 16. If step 144 determines that the requested relational table is controlled by pre-processor 20, the process proceeds to step 148 where pre-processor 20 determines whether the requested relational table has any table rows loaded into application RAM 22. If it does not, the process proceeds to step 150 where pre-processor 20 checks for other types of performance enhancements and retrieves the requested table row from either application RAM 22 or RDBMS 16 depending upon what performance enhancements are in place for the requested relational table. If step 148 determines that the requested relational table has table rows in application RAM 22, the process proceeds to step 152 where a determination is made regarding the existence of the requested table row in application RAM 22. If the requested table row is not in application RAM 22, the process then proceeds to step 154 where pre-processor 20 performs a normal database access using RDBMS 16. If step 152 determines that the requested table row is in application RAM 22, the process proceeds to step 156 where pre-processor 20 retrieves the requested table row from application RAM 22 and returns it for use in application 18.

Retention of Retrieved Relational Table Rows

Pre-processor 20 can retain all table rows requested during an execution of application 18 in application RAM 22 so that further requests for those table rows do not incur another RDBMS 16 request. Pre-processor 20 accomplishes this by placing the results of every keyed select request into RAM 22. Pre-processor 20 keeps track of what table rows are loaded in application RAM 22 and determines whether an access to application RAM 22 is required or an access to database 14 is required dependent upon the select request received from application 18. If the requested relational table row exists in RAM 22, the retrieval time is much faster than a request to RDBMS 16. Staging relational table rows into RAM 22 as they are retrieved does not incur any RDBMS 16 data access requests up front. Instead, this method expends the RDBMS data access request during the first request for access to a specific relational table row. All additional requests for access to that relational table row will retrieve it directly from RAM 22.

Figure 8:
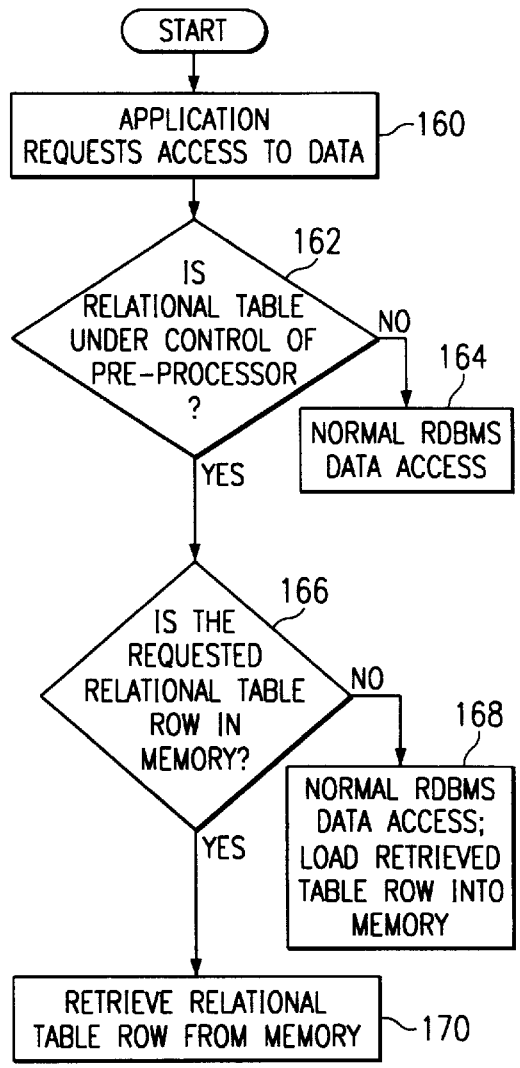
FIG. 8 is a flow diagram illustrating the basic process of retaining all previously retrieved relational table rows in random access memory.

FIG. 8 is a flow diagram illustrating the basic processing which takes place when pre-processor 20 receives an "initial" call causing it to read control file 41 which may contain instructions requesting that all requested table rows for a certain relational table be retained in memory for further use. The process commences at step 160 where application 18 requests access to a table row. The process proceeds to step 162 where a determination is made regarding whether the requested relational table is under the control of pre-processor 20. If it is not, the process proceeds to step 164 where a normal database access request is performed by RDBMS 16. If step 162 determines that the requested relational table is under the control of pre-processor 20, the process proceeds to step 166 where a determination is made regarding the existence of the requested table row in application RAM 22. If it is in application RAM 22, the process proceeds to step 170 where pre-processor 20 retrieves the requested row from application RAM 22 and returns it for use in application 18. If step 166 determines that the requested table row is not in application RAM 22, the process proceeds to step 168 where pre-processor 20 retrieves the requested table row from RDBMS 16, loads the requested table row into application RAM 22 for future use, and returns the retrieved table row for use in application 18.

Another form of staging data into memory is retaining the last X most frequently requested rows in memory, where X represents some number determined by the software engineer. For instance, X could be two hundred. In that case, pre-processor 20 would retain the last two hundred most frequently requested rows in application RAM 22. Pre-processor 20 keeps track of the number of requests for access to each of the table rows staged into application RAM 22. Therefore, when a request for access to a row which does not exist in application RAM 22 is received, pre-processor 20 retrieves the row from RDBMS 16 and overlays the least requested row in application RAM 22. If X rows have not yet been loaded into application RAM 22, pre-processor 20 loads the table row into the next available position. By doing this, pre-processor 20 can minimize the number of RDBMS requests since the most frequently requested records reside in RAM 22.

Figure 9:
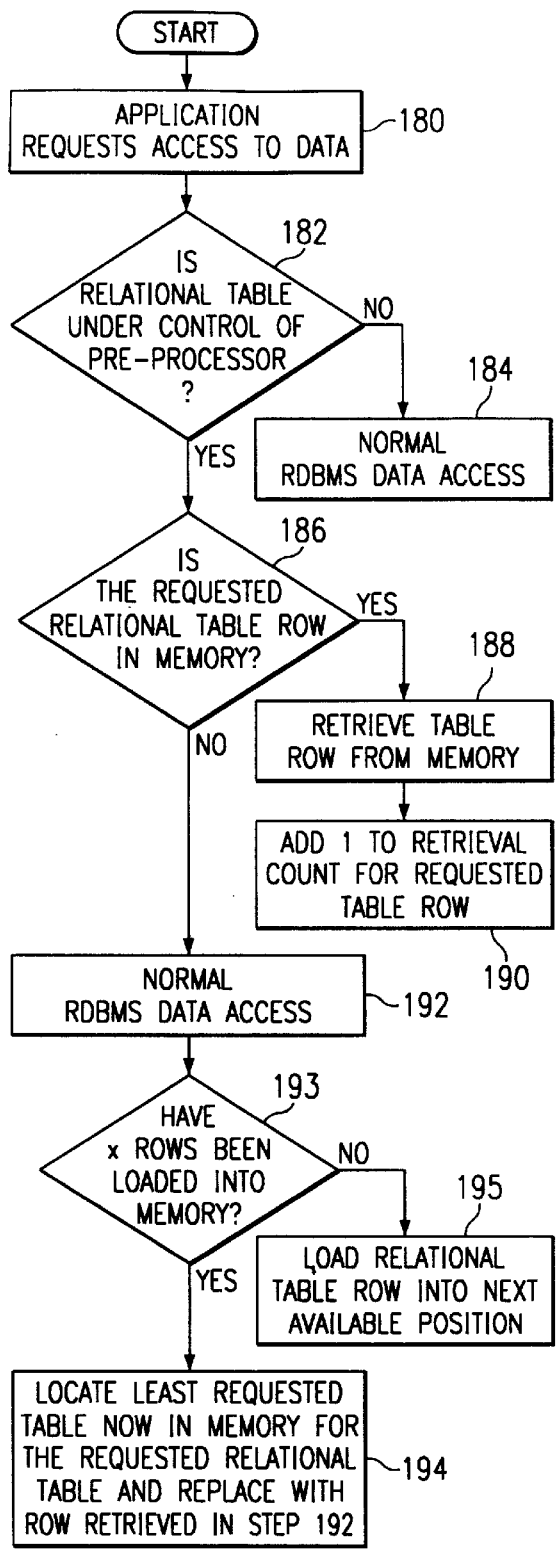
FIG. 9 is a flow diagram illustrating the basic process of retaining a specific number of the most frequently requested relational table rows in random access memory.

FIG. 9 is a flow diagram illustrating the basic process of retaining a specific number of the most frequently requested table rows in memory and the subsequent data access requests to those table rows by application 18. Pre-processor 20 receives an "initial" call causing it to read control file 41 which may contain instructions requesting that a specific number of the most frequently requested table rows for a particular table be retained in memory for subsequent data access requests. The process commences at step 180 where application 18 requests access to a relational table row. The process then proceeds to step 182 where a determination is made regarding whether the requested relational table is under the control of pre-processor 20. If it is not, the process proceeds to step 184 where a normal database access request is performed by RDBMS 16. If step 182 determines that the requested relational table is under the control of pre-processor 20, the process proceeds to step 186 where a determination is made regarding the existence of the requested table row in application RAM 22. If the requested table row is in application RAM 22, the process proceeds to step 188 where pre-processor 20 retrieves the requested relational table row from application RAM 22 and returns it for use in application 18. The process then proceeds to step 190 where pre-processor 20 adds one to the retrieval count for the requested table row which was just retrieved from application RAM 22.

If step 186 determines that the requested table row is not in application RAM 22, the process proceeds to step 192 where pre-processor 20 retrieves the requested table row from RDBMS 16. The process then proceeds to step 193 where a determination is made regarding whether X table rows have been loaded into application RAM 22. If step 193 determines that X rows have not yet been loaded into application RAM 22, the process proceeds to step 195 where the relational table row is loaded into the next available memory position and its retrieval counter is set to zero. If step 193 determines that X table rows have already been loaded into application RAM 22, the process proceeds to step 194 where pre-processor 20 locates the least requested table row in application RAM 22 for the requested relational table and replaces it with the table row just retrieved through RDBMS 16. The retrieval counter for each table row in application RAM 22 is used to determine which table row is the least requested. When a new table row is loaded into application RAM 22, its retrieval counter is reset to zero.

Subsetting a Table

Another form of staging data into memory in order to reduce data access requests to RDBMS 16 is to subset a relational table into memory-based on the known processing requirements of application 18. For example, if application 18 only processes relational table rows with a last name of "Doe", these records can be subsetted through a select statement and loaded into RAM 22 at the beginning of the execution of application 18. Pre-processor 20 then allows the subset in RAM 22 to be processed as a full relational table. An important advantage of this subsetting ability is that random accesses to a particular row in the subset are significantly more efficient due to the reduced number of rows which must be searched.

Figure 10:
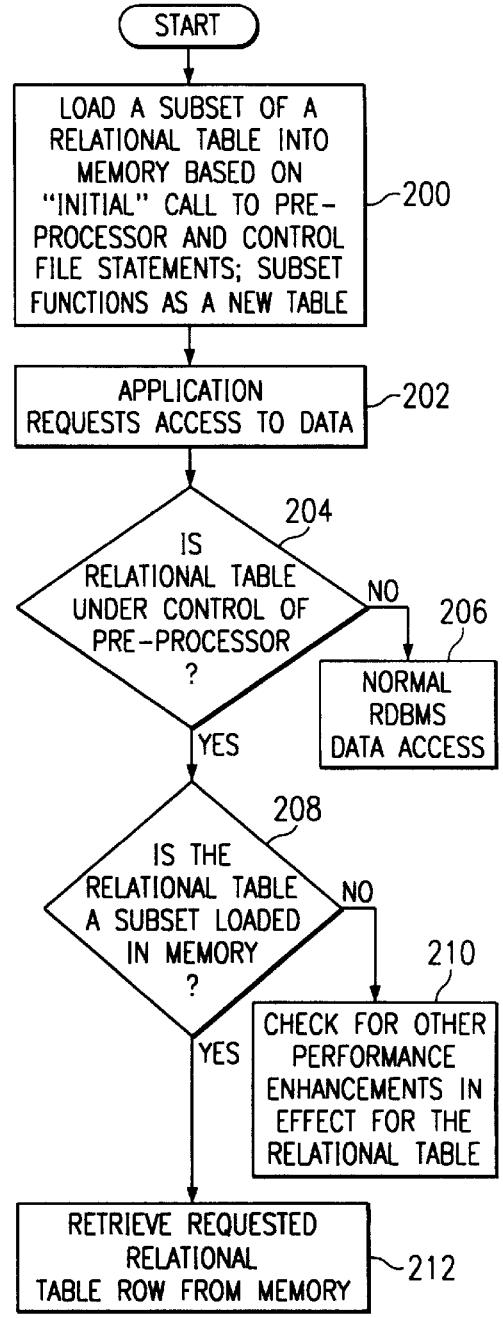
FIG. 10 is a flow diagram illustrating the basic process of loading a subset of a relational table into random access memory.

FIG. 10 is a flow diagram illustrating the basic process of loading a subset of a relational table into RAM 22 and the subsequent data access requests to the loaded table rows. The process commences at step 200 where pre-processor 20 receives an "initial" call causing it to read control file 41 which may contain instructions requesting that a subset of a certain relational table be loaded into RAM 22 so that it may be processed as a separate, complete relational table. Pre-processor 20 then selects and loads relational table rows based on information received in the parameter list of control file 41.

The process then proceeds to step 202 where application 18 requests access to a relational table row. The process then proceeds to step 204 where a determination is made regarding whether the requested relational table is under the control of pre-processor 20. If it is not, the process proceeds to step 206 where a normal database access request is performed by RDBMS 16. If step 204 determines that the requested relational table is under the control of pre-processor 20, the process proceeds to step 208 where a determination is made regarding whether the requested relational table is a subset in application RAM 22. If it is not, the process proceeds to step 210 where pre-processor 20 checks for other performance enhancements applicable to the requested relational table and retrieves the requested table row from application RAM 22 or RDBMS 16 dependent upon the performance enhancements in effect for the relational table. If step 208 determines that the requested relational table is a subset in application RAM 22, the process proceeds to step 212 where pre-processor 20 retrieves the requested table row from application RAM 22 and returns it for use in application 18.

Memory-Based Alternate Indexes

Pre-processor 20 can create an alternate index 24 which is loaded into application RAM 22. Memory-based alternate indexes may be created for relational tables which are wholly staged into application RAM 22. By doing this, both the relational table and the alternate index are resident in application RAM 22 thereby significantly decreasing the time to perform data access requests. The software engineer places statements in control file 41 which cause pre-processor 20 to stage the entire relational table into application RAM 22 and create a memory-based alternate index on a specified table column. Application 18 can access the specified relational table through alternate index 24 without incurring the expensive overhead processing associated with alternate indexes. This overhead includes RDBMS 16 creating and maintaining the alternate indexes whenever a table row is added to or deleted from database 14. In addition, alternate indexes can be changed which incurs additional overhead in updating the alternate index every time a table row has an alternate index column changed. Furthermore, accessing an alternate index in random access memory is significantly more efficient than accessing an alternate index which resides on a disk drive.

The software engineer utilizes this alternate index by coding a standard SQL select statement based on the alternate key. Pre-processor 20 then processes the select statement and finds the requested relational table row or rows by accessing alternate index 24 in RAM 22. Memory-based alternate indexes allow the software engineer to determine what secondary keys are necessary for application 18 without requiring RDBMS 16 to maintain those alternate indexes. In addition, memory-based alternate indexes allow a secondary key to be defined for a single application program.

Figure 11:
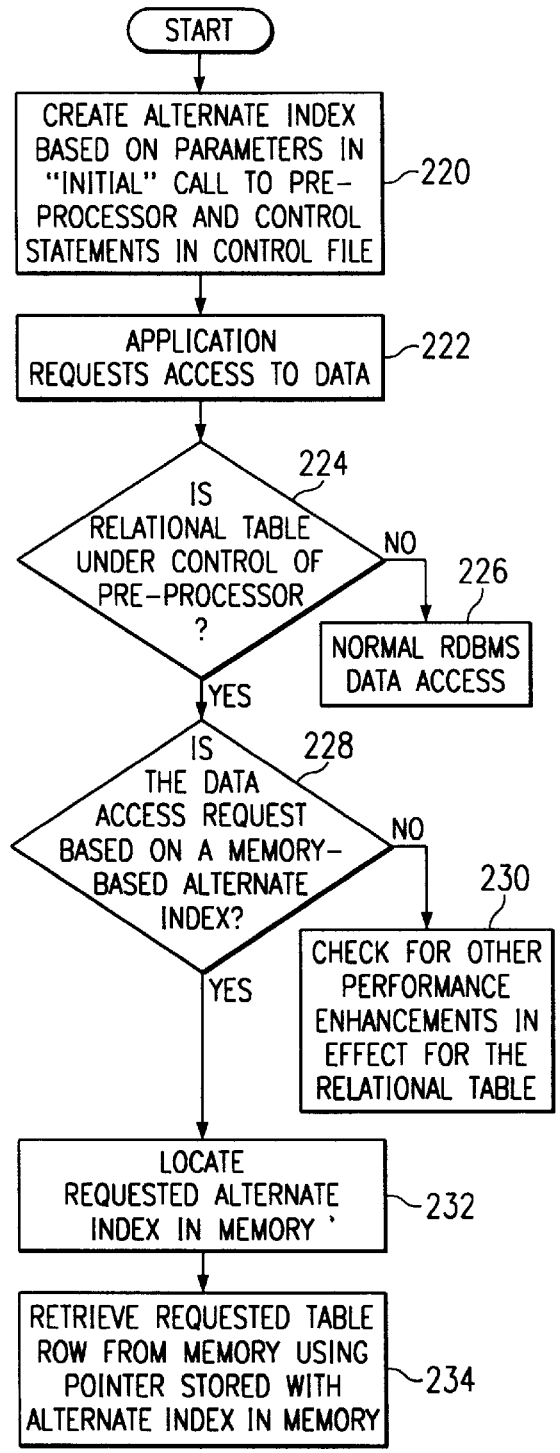
FIG. 11 is a flow diagram illustrating the basis processing associated with creating an alternate index for a relational table in random access memory.

FIG. 11 is a flow diagram illustrating the basic processing associated with creating a memory-based alternate index for a relational table and the subsequent use of that alternate index in application 18. The process commences at step 220 where pre-processor 20 receives an "initial" call causing it to read control file 41 which may contain instructions requesting that a memory-based alternate index be built for a certain relational table. Pre-processor 20 creates the memory-based alternate index based on information in the parameter list read from control file 41. The process then proceeds to step 222 where application 18 requests access to a relational table. The process then proceeds to step 224 where a determination is made regarding whether the requested relational table is under the control of pre-processor 20. If it is not, the process proceeds to step 226 where a normal database access is performed using RDBMS 16.

If step 224 determines that the requested relational table is under the control of pre-processor 20, the process proceeds to step 228 where a determination is made regarding whether the database access request to the relational table is based on the memory-based alternate index created in step 220. If it is not, the process proceeds to step 230 where pre-processor 20 checks for other performance enhancements applicable to application 18 and retrieves the requested data from application RAM 22 or RDBMS 16. If step 228 determines that the data access request is based on a memory-based alternate index, the process proceeds to step 232 where pre-processor 20 locates the requested alternate index item in application RAM 22. The process then proceeds to step 234 where pre-processor 20 retrieves the requested table row from application RAM 22 based on a pointer to the memory location stored with the alternate index item located in step 232. Pre-processor 20 then returns the requested table row for use in application 18.

Deferred Updates

Another performance enhancement of pre-processor 20 is the ability to defer all updates to a relational table in database 14 until application 18 terminates. In order to defer updates to a relational table, application 18 should lock the relational table so that no other application can attempt an update to or read from the relational table until application 18 terminates. If application 18 requests pre-processor 20 to defer all updates to a certain relational table until termination of application 18, pre-processor 20 saves all update requests to that relational table in a saved updates 26 area. Saved updates 26 may be saved in memory and on a disk drive. Whenever application 18 attempts to update a row in a relational table with the deferred updates option activated, pre-processor 20 updates the row in application RAM 22, saves the update request to saved updates 26, and continues processing. When application 18 is ready to terminate, pre-processor 20 performs all updates in saved updates 26 to the specified relational table in database 14. By deferring updates until termination of application 18, the expense of updating a relational table row, in runtime and RDBMS requests, is deferred until application 18 has completed all of its assigned tasks. Therefore, the efficiency of application 18 is enhanced since its processing is not delayed due to time consuming updates during execution of application 18.

Figure 12:
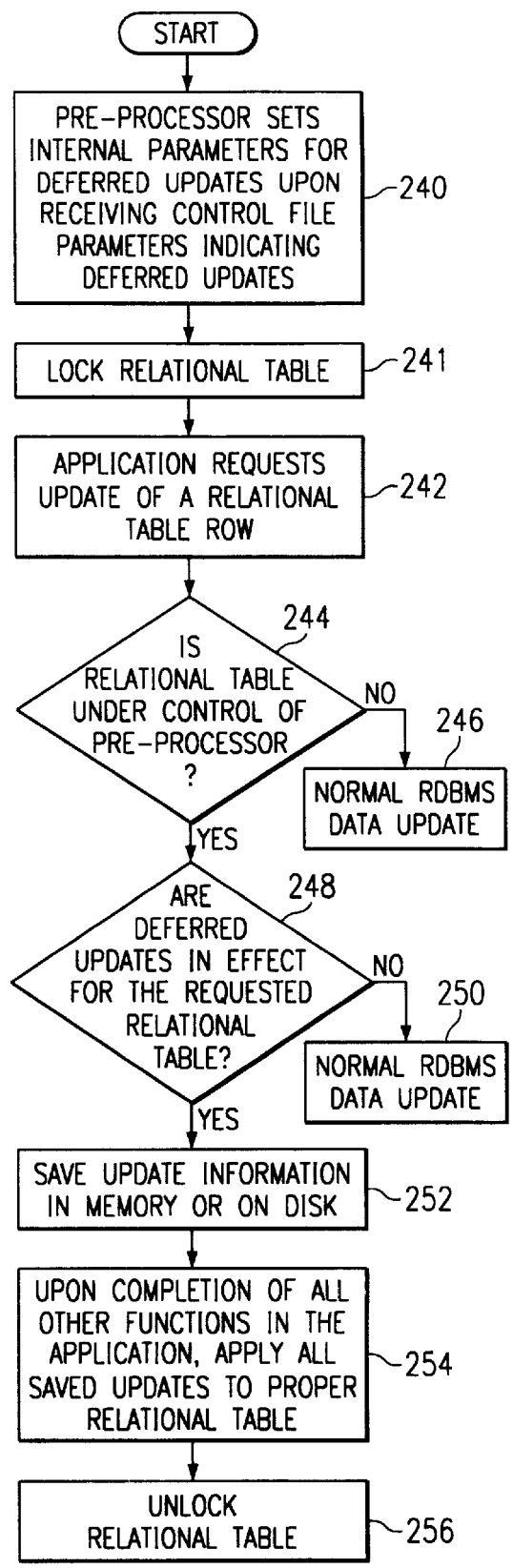
FIG. 12 is a flow diagram illustrating the process involved in deferring updates to a relational table until the termination of a software application program.

FIG. 12 is a flow diagram illustrating the basic method involved in deferring updates to a certain relational table until termination of application 18. The method commences at step 240 where pre-processor 20 receives an "initial" call causing it to read control file 41 which may contain instructions requesting that updates to a certain relational table be deferred until the end of application 18. Pre-processor 20 sets the appropriate internal parameters so that all updates to the requested relational table are saved and performed at the end of application 18. The method then proceeds to step 241 where the requested relational table is locked so that no other applications can attempt updates until application 18 terminates. The method then proceeds to step 242 where application 18 requests update of a relational table row. The method then proceeds to step 244 where a determination is made regarding whether the requested relational table is under the control of pre-processor 20. If it is not, the method proceeds to step 246 where a normal database update is performed using RDBMS 16.

If step 244 determines that the requested relational table is under the control of pre-processor 20, the method proceeds to step 248 where pre-processor 20 determines if deferred updates are applicable to the requested relational table. If the requested relational table does not have deferred updates, the method proceeds to step 250 where a normal relational database update is performed using RDBMS 16. If step 248 determines that the requested relational table has all of its updates deferred until termination of application 18, the method proceeds to step 252 where the requested update information is saved in both application RAM 22 and a saved updates 26 area. Application 18 continues processing until it reaches its termination point at which time the method proceeds to step 254 where all update information saved in step 252 is retrieved and applied to the requested relational table in database 14. The method then proceeds to step 256 where the relational table is unlocked. After step 256 is complete, application 18 terminates.

Enhanced Search/Sort

Pre-processor 20 also includes a more efficient search and sort engine. Most table search and sort engines are based on a standard binary search or sort technique. This is generally thought to be an efficient method of doing searches and sorts. However, there are more efficient methods of searching a relational table or sorting information. One of these more efficient methods is based on the Fibonacci number sequence. Utilizing the Fibonacci number sequence in designing a technique to search a database table results in fewer CPU instructions in order to locate the requested row. Likewise, a sort technique based on the Fibonacci number sequence utilizes fewer CPU instructions in sorting a given set of information in a particular order.

Figure 13:
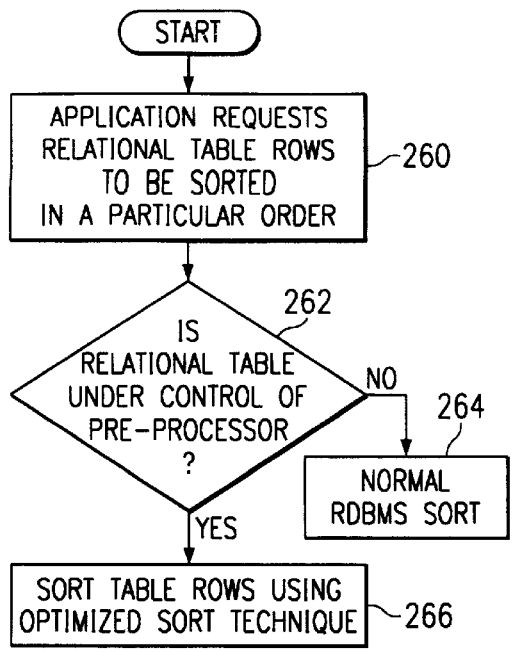
FIG. 13 is a flow diagram illustrating an optimized sort technique.

FIG. 13 is a flow diagram illustrating the optimized sort technique of the present invention. The method commences at step 260 where application 18 requests that certain relational table rows be sorted in a particular order. This request may be made by using the "ORDER BY" sub-verb on a "SELECT" SQL statement. The method proceeds to step 262 where a determination is made regarding whether the relational table which supplied the relational table rows in step 260 is under the control of pre-processor 20. If it is not, the method proceeds to step 264 where the relational table rows are sorted in the standard manner of RDBMS 16. If step 262 determines that the relational table is under the control of pre-processor 20, the method proceeds to step 266 where the relational table rows retrieved in step 260 are sorted using an optimized sort procedure.

Figure 14:
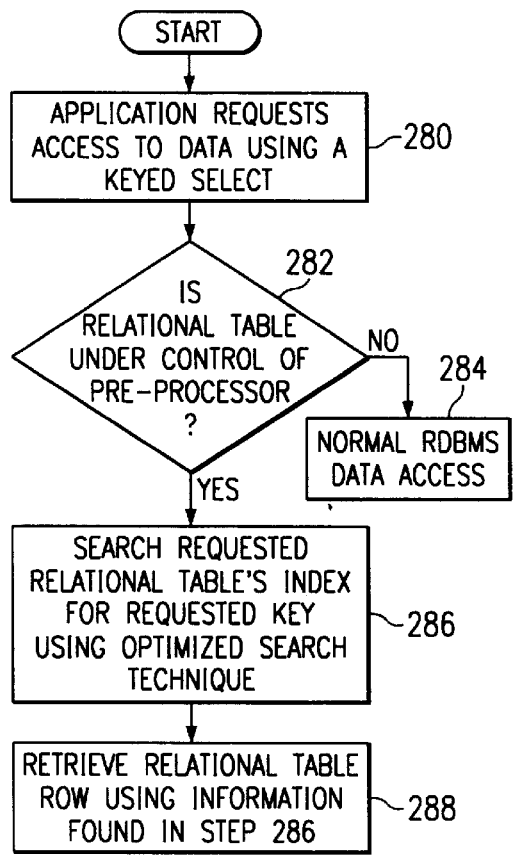
FIG. 14 is a flow diagram illustrating an optimized search technique.

FIG. 14 is a flow diagram illustrating an optimized search technique as defined in the present invention. The method commences at step 280 where application 18 requests access to a relational table row based on a "SELECT" SQL statement using a specific key. The process then proceeds to step 282 where a determination is made regarding whether the relational table which is the subject of the SQL "SELECT" statement of step 280 is under the control of pre-processor 20. If it is not, the method proceeds to step 284 where a normal database access is performed using RDBMS 16. If step 282 determines that the requested relational table is under the control of pre-processor 20, the method proceeds to step 286 where pre-processor 20 searches the requested relational table's index using an optimized search technique. The method then proceeds to step 288 where the relational table row associated with the index located in step 286 is retrieved and returned for use in application 18.

Simulation Mode

Another performance enhancement of pre-processor 20 is geared toward making software engineers more efficient and productive. Pre-processor 20 includes a simulation mode so that application programs can be tested on live production data without actually altering or updating any of that data. The software engineer sets an input parameter to application 18 in control file 41 which informs pre-processor 20 to run in simulation mode. Simulation mode allows all accesses to a relational database but prevents the actual updating or altering of any data. By utilizing simulation mode, application 18 can be tested using a live production database instead of a test version of that database. This speeds up testing since the software engineer does not have to have a database administrator load a test version of the database before tests can commence. Furthermore, the database does not have to be reloaded each time the software engineer needs to rerun the application. Therefore, multiple runs against live production data can be run without the necessity of loading and reloading test versions of the database.

Figure 15:
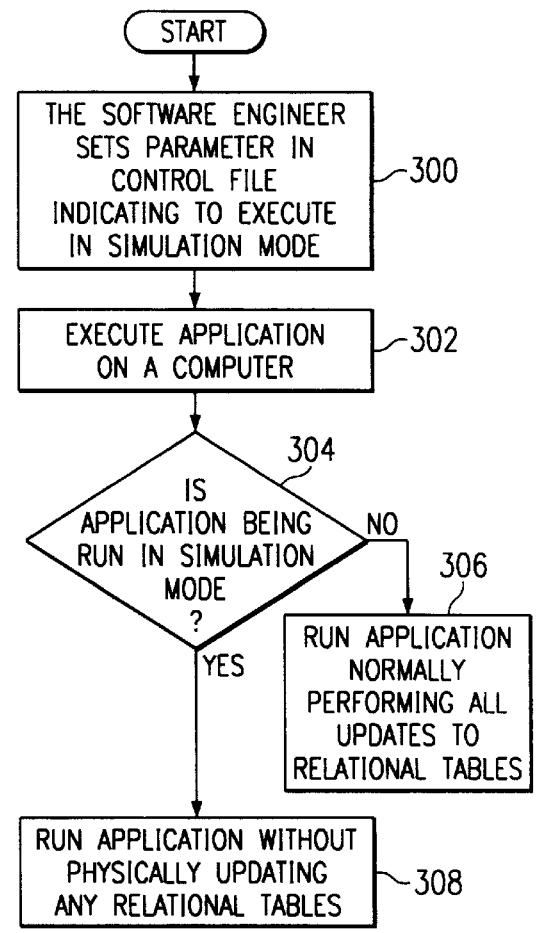
FIG. 15 is a flow diagram illustrating the use of a simulation mode.

FIG. 15 is a flow diagram illustrating the simulation mode of the present invention. The method commences at step 300 where a software engineer sets a parameter in control file 41 which informs pre-processor 20 that application 18 is to be run in simulation mode. The method then proceeds to step 302 where application 18 is executed on computer 10. The method then proceeds to step 304 where, during execution of application 18, a determination is made regarding whether application 18 is being run in simulation mode. If it is not, the method proceeds to step 306 where application 18 runs normally and all updates are performed as necessary to database 14. If step 304 determines that application 18 is being run in simulation mode, the method proceeds to step 308 where application 18 executes normally in all ways except that no updates are actually performed to any relational table in database 14.

According to the teachings of the present invention, a system for enhancing the performance of a relational database management system is provided that reduces utilization of the RDBMS and eliminates unnecessary RDBMS processing based on the requirements of an application. The advantages of the performance enhancement system for a relational database management system include reduced RDBMS utilization resulting in reduced runtime, the creation of memory-based alternate indexes as needed, and a simulation mode which allows testing against live production data.

Thus, it is apparent that there has been provided in accordance with the present invention a system for enhancing performance of a relational database management system that satisfies the advantages set forth above. Although the present invention and its advantages have been described in detail, it should be understood that various changes, substitutions, and alterations readily apparent to those skilled in the art may be made herein without departing from the spirit and the scope of the present invention as defined by the following claims.

What is claimed is:

1. A system for enhancing the performance of a relational database management system, comprising:

a computer running a relational database management system (RDBMS);

a data storage device containing a database under control of the RDBMS;

a database manager pre-processor operable to reduce the RDBMS processing involved with accesses to the database based on requirements of a software application for the purpose of decreasing the system resources required to run an application and thereby decreasing the run-time of the application; and a memory coupled to the computer and operable to store database information as needed by the database manager pre-processor, the software application being assigned a portion of the memory for its own control unique from other portions of the memory assigned to other software applications.

2. The system of claim 1, wherein the database manager pre-processor reduces the RDBMS utilization by staging data into memory, using memory-based alternate indexes, and deferring updates to the database until the application terminates.

3. The system of claim 1, further comprising:

an alternate index module operable to create an index in memory on a database table column to allow indexed access of the database table on the specified table column for a database table that has been staged into memory.

4. The system of claim 1, further comprising:

a deferred update module operable to perform all updates to a database table at termination of the application instead of during execution of the application.

5. The system of claim 1, further comprising:

a simulator function wherein no physical updates are made to the database tables.

6. The system of claim 1, further comprising:

a log file of every database manager pre-processor operation performed during execution of an application program.

7. The system of claim 1, wherein the database manager pre-processor further comprises a staging module operable to stage data from the database into memory for use by the application.

8. The system of claim 7, wherein the staging module stages the data from the database by placing an entire database table into memory when an application starts so that requests for the database table rows are not required to perform another RDBMS operation.

9. The system of claim 7, wherein the staging module stages the data from the database by placing specified table rows into memory when an application starts so that requests for the database table rows are not required to perform another RDBMS operation.

10. The system of claim 7, wherein the staging module stages the data from the database by placing table rows which satisfy a select on partial key into memory when an application starts so that requests for the database table rows are not required to perform another RDBMS operation.

11. The system of claim 7, wherein the staging module stages the data from the database by placing all requested table rows from a database table into memory so that additional requests for the database rows are not required to perform another RDBMS operation.

12. The system of claim 7, wherein the staging module stages the data from the database by placing a specified number of table rows which have been most frequently requested during the current execution of the application into memory so that additional requests for the table rows are not required to perform another RDBMS input request operation unless the table row has been overlaid in memory.

13. The system of claim 7, wherein the staging module stages the data from the database by placing a subset of a database table into memory when an application starts so that requests for the database rows within the subset are not required to perform another RDBMS operation.

14. The system of claim 1, further comprising:

an interface language operable to communicate instructions to the database manager pre-processor.

15. The system of claim 14, wherein the interface language is standard Structured Query Language (SQL).

16. The system of claim 1, further comprising:

an optimized sort module operable to sort database table rows more efficiently than a standard binary sort.

17. The system of claim 16, wherein the optimized sort module utilizes a sort function based on a Fibonacci number sequence.

18. The system of claim 1, further comprising:

an optimized search module operable to search either a memory resident database table or a memory-based alternate index more efficiently than a standard binary search.

19. The system of claim 18, wherein the optimized search module utilizes a search function based on a Fibbonacci number sequence.

20. A system for enhancing the performance of a relational database management system, comprising:

a computer running a relational database management system (RDBMS);

a data storage device containing a database under control of the RDBMS;

a database manager pre-processor operable to reduce the RDBMS processing based on requirements of an application for the purpose of decreasing the system resources required to run an application and thereby decreasing the run-time of the application; and a memory coupled to the computer and operable to store database information as needed by the database manager pre-processor;

an interface language operable to communicate instructions to the database manager pre-processor, wherein the interface language is standard Structured Query Language (SQL);

an install module operable to read an instruction file and generate within the application source code an initialization statement for each table under the control of the database manager pre-processor and parameter lists for each SQL statement in the application source code for tables under the control of the database manager pre-processor, the install module further operable to generate database manager pre-processor commands utilizing the parameter lists for each SQL statement for a table under the control of the database manager pre-processor, the install module further operable to generate logic determinative of which commands are processed dependent upon whether the database table is under control of the RDBMS or the database manager pre-processor.

21. A method of enhancing the performance of a relational database management system, comprising:

providing a computer running a relational database management system (RDBMS);

providing a data storage device containing a database which includes various tables under the control of the RDBMS;

providing a memory coupled to the computer and operable to store database information;

reducing the number of RDBMS operations that a software application is required to perform for the purpose of decreasing the system resources required to run an application program, the software application being assigned a portion of the memory for its own control unique from other portions of the memory assigned to other software applications; and eliminating RDBMS processing which is unnecessary to the proper functioning of an application program for the purpose of decreasing the system resources required to run an application program.

22. The method of claim 21, wherein the step of reducing the number of RDBMS operations is accomplished by staging database data into memory, creating alternate indexes in memory, and deferring updates to database tables until the application terminates.

23. The method of claim 22, wherein the step of staging the data into memory includes placing an entire database table in memory when an application starts so that requests for the database table rows are not required to perform an RDBMS operation.

24. The method of claim 22, wherein the step of staging the data into memory includes placing specified table rows in memory when an application starts so that requests for the database table rows are not required to perform an RDBMS operation.

25. The method of claim 22, wherein the step of staging the data into memory includes placing table rows which satisfy a select on partial key in memory when an application starts so that requests for the database table rows are not required to perform an RDBMS operation.

26. The method of claim 22, wherein the step of staging the data into memory includes placing all database records requested during the current execution of the application into memory so that additional requests for the database records are not required to perform another RDBMS operation.

27. The method of claim 22, wherein the step of staging the data into memory includes placing a specified number of the most requested database rows during the current execution of the application into memory so that additional requests for the database rows are not required to perform another RDBMS operation unless the database row has been overlaid in memory.

28. The method of claim 22, wherein the step of staging the data into memory includes placing a subset of a database table in memory so that requests for the database records are not required to perform another RDBMS operation.

29. The method of claim 22, wherein the step of creating an alternate index in memory includes creating in memory an alternate index for a specified database table column so that a memory resident database table can be accessed through the memory-based alternate index.

30. The method of claim 22, wherein the step of deferring updates to a database table includes deferring all updates to a specified database table until the application program in control of the database table terminates.

31. The method of claim 21, further comprising:

sorting database table rows using a sort which is more efficient than a standard binary sort.

32. The method of 31, wherein the step of sorting database table rows utilizes a sort function based on a Fibonacci number sequence.

33. The method of claim 21, further comprising:

searching a memory resident database table or memory-based alternate index using a search which is more efficient than a standard binary search.

34. The method of 33, wherein the step of searching a memory resident database table or memory-based alternate index utilizes a search function based on a Fibonacci number sequence.

35. The method of claim 21, further comprising:

simulating updates to a database by not physically updating the database when an update is requested by the application.

36. The method of claim 21, further comprising:

keeping a log file of all database manager pre-processor operations performed during execution of an application program.

* * * * *